(12) United States Patent
Walter (10) Patent No.: US 9,367,449 B2
(45) Date of Patent: Jun. 14, 2016

(54) HIERARCHICAL GARBAGE COLLECTION IN AN OBJECT RELATIONAL DATABASE SYSTEM

(71) Applicant: Owtware Holdings Limited, BVI, Shanghai (CN)

(72) Inventor: Douglas Allen Walter, Shanghai (CN)

(73) Assignee: Owtware Holdings Limited, BVI (CN)

( * ) Notice: Subject to any disclaimer, the term of this patent is extended or adjusted under 35 U.S.C. 154(b) by 209 days.

(21) Appl. No.: 14/024,028

(22) Filed: Sep. 11, 2013

(65) Prior Publication Data

US 2015/0074155 A1    Mar. 12, 2015

(51) Int. Cl.
*G06F 17/30* (2006.01)
*G06F 12/02* (2006.01)

(52) U.S. Cl.
CPC ............ *G06F 12/0269* (2013.01); *G06F 17/30* (2013.01)

(58) Field of Classification Search
CPC . G06F 12/0269; G06F 12/0253; G06F 17/30; G06F 12/0261; G06F 12/076
USPC ........................................................ 707/816
See application file for complete search history.

(56) References Cited

U.S. PATENT DOCUMENTS

| 6,216,212 | B1* | 4/2001 | Challenger ....... G06F 17/30902 707/999.008 |
| 9,104,678 | B1* | 8/2015 | Nemes .............. G06F 17/30097 |
| 2002/0194421 | A1* | 12/2002 | Berry .................. G06F 11/3471 711/100 |
| 2003/0105772 | A1* | 6/2003 | Sexton et al. ............. 707/103 R |
| 2006/0235811 | A1* | 10/2006 | Fairweather ............ G06F 8/427 706/12 |
| 2007/0255909 | A1* | 11/2007 | Gschwind ........... G06F 12/0269 711/147 |
| 2008/0183958 | A1* | 7/2008 | Cheriton ............. G06F 12/0223 711/108 |
| 2011/0087713 | A1* | 4/2011 | Beard ................. G06F 12/0269 707/816 |
| 2011/0137940 | A1* | 6/2011 | Gradin .............. G06F 17/30867 707/769 |
| 2011/0191544 | A1* | 8/2011 | Naga et al. ..................... 711/133 |
| 2012/0233134 | A1* | 9/2012 | Barton ................ H04L 67/1023 707/692 |
| 2012/0239685 | A1* | 9/2012 | Kahn ................ G06F 17/30348 707/769 |
| 2014/0032841 | A1* | 1/2014 | Ahmad ............... G06F 12/0246 711/115 |

FOREIGN PATENT DOCUMENTS

| CN | 1561496 A | 1/2005 |
| CN | 101233505 A | 7/2008 |
| CN | 102047231 A | 5/2011 |
| CN | 10367825 A | 3/2014 |

OTHER PUBLICATIONS

International Search Report in patent application PCT/IB2014/064129, mailed Jan. 28, 2015.
Written Opinion of the International Search Report in patent application PCT/IB2014/064129, mailed Jan. 28, 2015.
International Preliminary Report on Patentability for PCT/IB2014/064129 dated Mar. 15, 2016.

* cited by examiner

*Primary Examiner* — Leslie Wong
(74) *Attorney, Agent, or Firm* — Fish & Richardson P.C.

(57) ABSTRACT

Techniques of hierarchical garbage collection in an object-relational database system are described. When the object-relational database system receives a request to delete an object, the object-relational database system marks the object for deletion. A garbage collection procedure executing in the background can perform iterations of sweep and mark to delete the object and children objects of the object. In each iteration, a layer or "generation" of objects is deleted. The garbage collection procedure can continue the iterations until the object and all descendants of the objects are deleted.

22 Claims, 8 Drawing Sheets

HIERARCHICAL GARBAGE COLLECTION IN AN OBJECT RELATIONAL DATABASE SYSTEM

TECHNICAL FIELD

This disclosure relates generally to database management.

BACKGROUND

An object-relational database can be a relational database system that is programmed, extended, or customized to store, query, and retrieve data objects. In an object-relational database, objects, classes, and relationships between objects or between classes can be represented in database schemas that define tables and relationships between tables. Compared to a conventional relational database where relationship between data is usually flat, relationship between objects in an object-relational database can be hierarchical. Accordingly, when handling deletion of an object, an object-relational database can encounter situations where the object to be deleted has one or more children objects. Conventionally, an object-relational database system can use explicit recursive delete or reference counting to handle deletions to ensure that when an object is deleted, descendants of the object are also deleted.

SUMMARY

Techniques of hierarchical garbage collection in an object-relational database system are described. When the object-relational database system receives a request to delete an object, the object-relational database system marks the object for deletion. A garbage collection procedure executing in the background can perform iterations of sweep and mark to delete the object and children of the object. In each iteration, a layer or "generation" of objects is deleted. The garbage collection procedure can continue the iterations until the object and all descendants of the objects are deleted.

The features described in this specification can be implemented to achieve one or more advantages. For example, in some implementations, hierarchical garbage collection can be a systematic and incremental mechanism to perform deep and recursive deletions of arbitrarily complex objects mapped to a relational database system. Compared to conventional object deletion operations, hierarchical garbage collection can be more efficient.

Compared to conventional implementations, hierarchical garbage collection can be more scalable. Hierarchical garbage collection can be implemented using customized schedules, thresholds, and checkpoints to enable handling of enterprise scale databases having large number (e.g., millions) of objects and child objects in arbitrarily deep configurations.

Compared to conventional implementations, hierarchical garbage collection can yield a more responsive application experience. Hierarchical garbage collection can be implemented such that the actor requesting to delete the object (usually the end-user application) need only mark the object for deletion and immediately return control to the application without waiting for a full and complete cleanup of children objects. In contrast, a conventional approach may block the application from continuing execution while the delete operation is performed synchronously.

In some implementations, compared to conventional object deletion operations, hierarchical garbage collection can be simpler. Hierarchical garbage collection can be implemented using a procedure executing in the background, and needs no application level or user level intervention. To delete an object, an application program only needs to mark the object for deletion, without having to manage deletion of children of the object.

The details of one or more implementations of hierarchical garbage collection are set forth in the accompanying drawings and the description below. Other features, aspects and advantages of hierarchical garbage collection will become apparent from the description below, the drawings and the claims.

BRIEF DESCRIPTION OF THE DRAWINGS

Like reference symbols in the various drawings indicate like elements.

DETAILED DESCRIPTION

Example of Hierarchical Garbage Collection System

Figure 1:
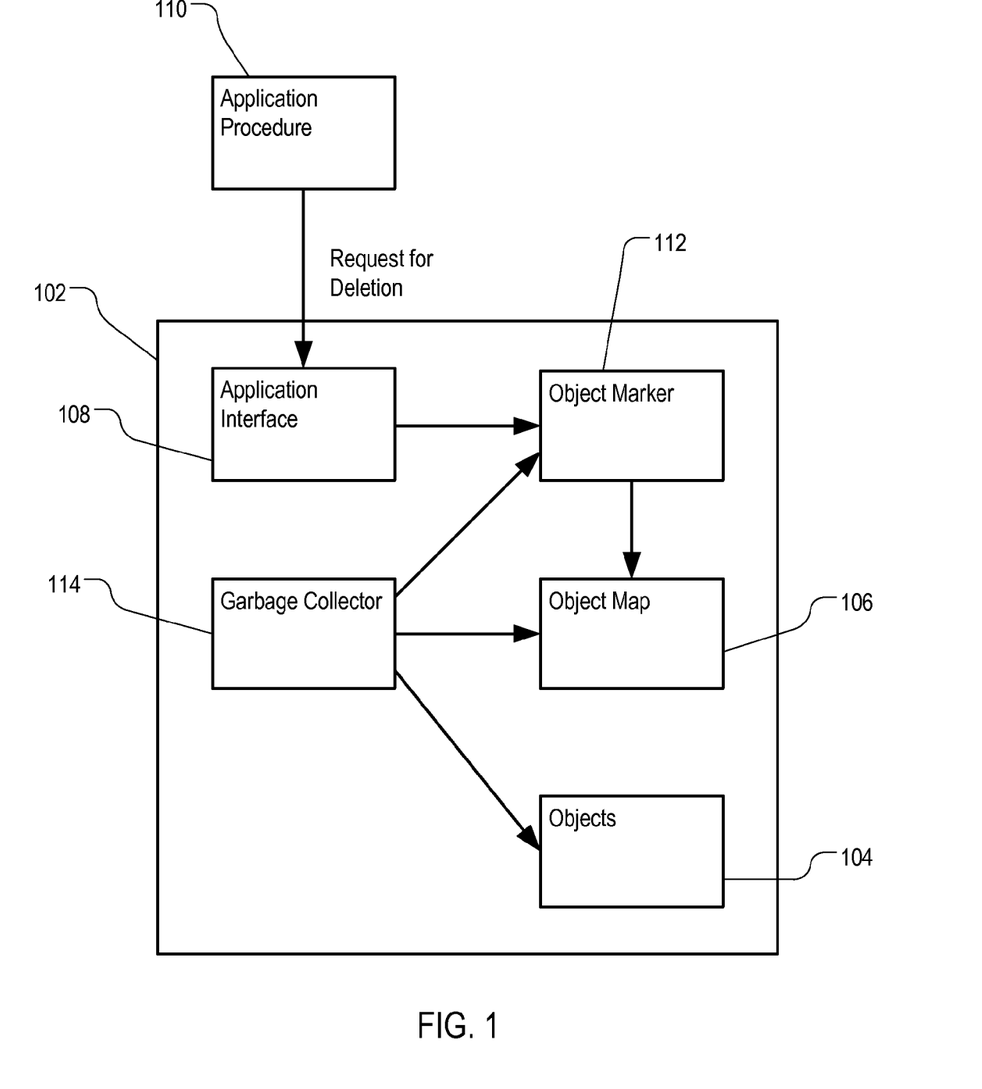
FIG. 1 is a block diagram providing an overview of an example of hierarchical garbage collection of an object-relational database.

FIG. 1 is a block diagram providing an overview of a hierarchical garbage collection of an object-relational database 102. The object-relational database 102 is programmed to store, query, and retrieve objects 104. The objects 104 can include multiple data objects having interdependencies that are represented in an object graph. The objects 104 can include a parent object and a child object that is referenced by the parent object. Additional details of the objects 104 are described below in reference to FIG. 2.

The object-relational database 102 includes object map 106. The object map 106 is a component of the object-relational database 102 that maps the objects 104 into a relational model. The object map 106 can convert inherently hierarchical relationships among the objects 104 into an equivalent flat relational model used in a relational database context. Additional details of the object map 106 are described below in reference to FIG. 3.

The object-relational database 102 includes application interface 108. The application interface 108 is a component of the object-relational database 102 configured to receive a request from an application procedure 110 to query, modify and, especially, to delete a data object from the objects 104. The application procedure 110 can be a stored procedure within the object-relational database 102, an application program outside of the object-relational database 102, or a user entered query or procedure. The request can include an object identifier (e.g., an object name) of the object to be deleted.

Upon receiving the request to delete the object, the application interface 108 provides the object identifier to object marker 112. The object marker 112 is a component of the object-relational database 102 configured to receive an object identifier and then mark, in object map 106, an object identified by the received object identifier for deletion.

The object-relational database 102 includes a garbage collector 114. In some implementations, the garbage collector 114 is a component of the object-relational database 102 that executes a procedure in the background, e.g., automatically and periodically, independently of requests received by the application interface 108. The garbage collector 114 reads the object map 106 to identify objects marked by the object marker 112. When the garbage collector 114 detects an object marked by the object marker 112, the garbage collector 114 deletes, from objects 104, the corresponding object.

In addition, the garbage collector 114 can perform hierarchical object deletion operations. In the hierarchical object deletion operations, the garbage collector 114 iterates through the object map 106. Each iteration can be a separate activation of the background procedure. In each iteration, the garbage collector 114 can delete, from objects 104, the object marked by object marker 112. In addition, the garbage collector can identify, from the object map 106, direct (e.g., first generation) children objects of the object marked by object marker 112. In the iteration, the garbage collector 114 can provide object identifiers of the first generation children objects to the object marker 112. In turn, the object marker 112 can mark each first generation child object in the object map 106.

In a next iteration, the garbage collector 114 can delete the first generation children objects of the original object to be deleted, now marked by the object marker 112. The garbage collector 114 can then identify and mark second-generation children objects of the original object. The garbage collector 114 can continue performing the iterations where, in each iteration, a generation of children of the original object are deleted, and a deeper generation of children objects of the original object are marked. The garbage collector 114 can repeat the background process until all descendants of the object requested to be deleted are deleted from the objects 104.

Figure 2:
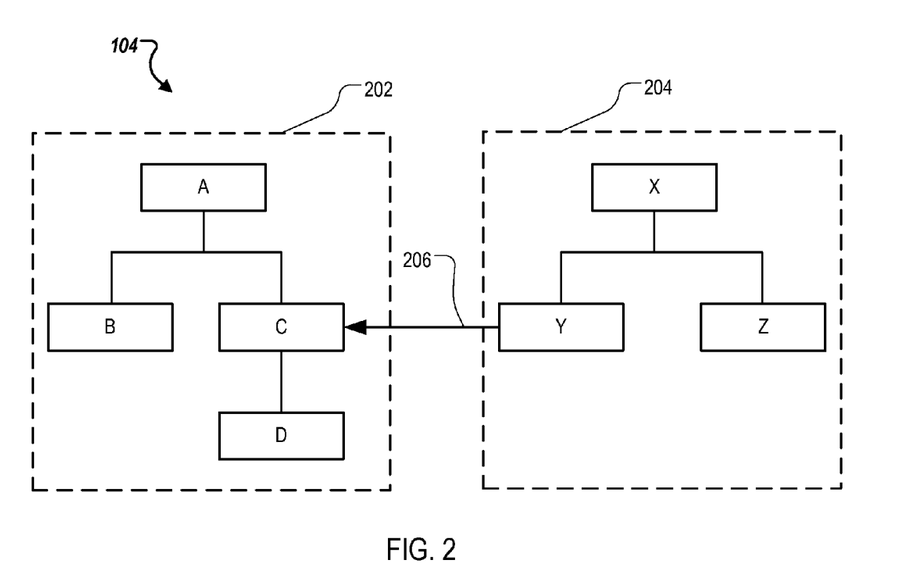
FIG. 2 is a diagram illustrating an example of an object structure in the object-relational database of FIG. 1.

FIG. 2 is a diagram illustrating an object structure in the object-relational database 102. The objects 104 stored in the object-relational database 102 can include, for example, objects A, B, C, and D.

Each of the objects A, B, C and D can be, for example, a collection of data stored on a storage device (e.g., in computer memory or on hard disk). Each of the objects A, B, C and D can be treated as a separate and distinct unit of data having a single storage address (e.g., an address in computer memory). Each of the objects A, B, C and D can reference another object. For example, each of the objects A, B, C and D can include one or more pointers (addresses that can be reassigned and can be null) to other objects or references (addresses that cannot be reassigned and cannot be null) of other objects. The pointers and references can create a dependency relationship between the two objects.

For example, in FIG. 2, object A references object B by including a pointer to or reference of object B. Accordingly, object B is dependent on object A. Object A is a parent object (or first generation ancestor object) of object B. Object B is a child object (or first generation descendent object) of object A. In addition, object A, which references object C, is a parent object of C, which, in turn, is a parent object of object D.

There are two levels of dependencies between object A and object D. Accordingly, object A is a second-generation ancestor object of object D, and object D is a second-generation descendant object of object A.

The dependency relationship between objects can be represented as an object graph having multiple nodes and multiple edges connecting the nodes. Each node can represent an object. Each edge between two nodes can represent a parent-child relationship between objects represented by the two nodes. Object tree 202 is an object graph representing the hierarchical parent-child relationships between objects A, B, C and D. The object tree 202 is a regular tree, in which each object can have at most one parent. The object tree 202 can have one or more root objects, where each root object is an object having no parent. In the object tree 202, object A, which is dependent on no other objects, is a root object.

Cross-referencing between objects can occur in the object-relational database 102. For example, the objects 104 of the object-relational database 102 can include objects X, Y and Z, which relate to each other as represented in object tree 204. Object Y, being a child object of object X in the object tree 204, can include a pointer to, or reference of, object C. To preserver regularity of the object trees 202 and 204, a relationship 206 between object C and object Y can be managed at an application level, e.g., by an application program or procedure that uses the pointer to or reference of object C in object Y. The relationship can be a soft link, where cross-referencing between object C and object Y is represented in neither the object tree 202 nor the object tree 204. The application program or procedure is responsible for cleaning up the relationship 206 based on application-defined heuristics.

Figure 3:
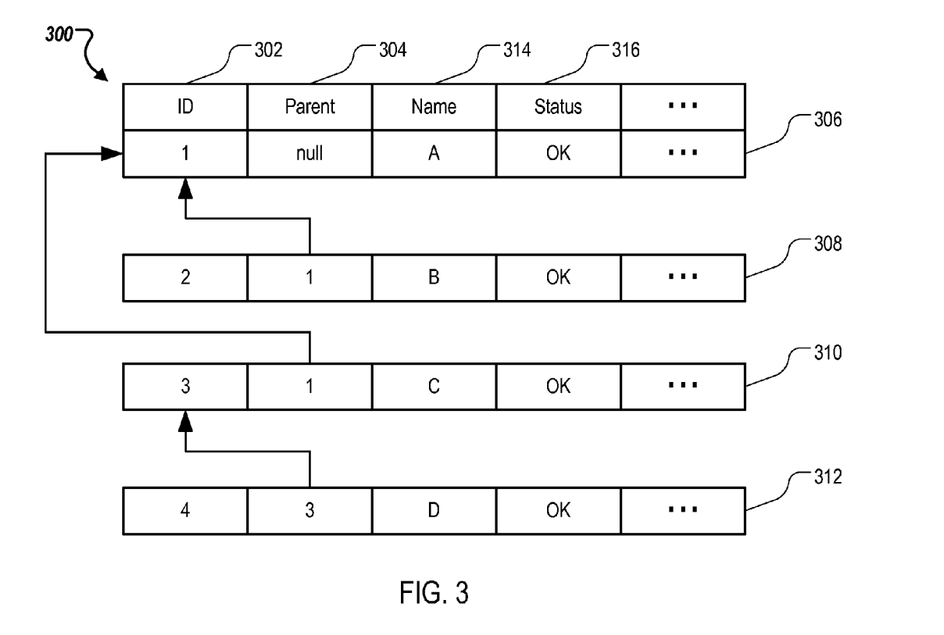
FIG. 3 is a diagram illustrating an example table structure corresponding to the object structure of FIG. 2.

FIG. 3 is a diagram illustrating an object table 300 corresponding to the object structure of FIG. 2. Object table 300 can be a portion of the object map 106 of FIG. 1.

Object-relational database 102 can have a relational model, where information is stored in tables. The tables have typed (e.g., integer, date or string) and named (e.g., "id" or "name") columns, and rows each of which contains an instance of data. Each row of a table can have multiple data fields each of which corresponds to a column of the table. A relation in the object-relational database 102 can be a function that creates a 1-to-0, 1-to-1, or 1-to-many relationship between a data row in a table and another data row in the same table or another table.

Objects of the object tree 202 are represented in object table 300, which maps object data into the relational model of the object-relational database 102. The object table 300 can map inherently hierarchical relationships between objects A, B, C and D as indicated in the object tree 202 into a flat relational model in a relational database system that is equivalent to the hierarchical relationships. The mapping can be based on parent-child relations or path expressions. For illustrative purpose, a parent-child relation based conversion is provided as the example shown in FIG. 3. In some implementations, path expression based conversion can be used.

The object table 300 contains object identifier column 302 and parent object column 304 for describing a parent-child relation among objects A, B, C and D of FIG. 2. The object identifier column 302 is a column for storing an identifier of an object. The parent object column 304 is a column for storing an identifier of a parent object of the object. For example, a row 306 of object table 300 stores a data record corresponding to object A of object tree 202. A data field of the row 306 corresponding to object identifier column 302 (object identifier data field) stores an identifier of object A (e.g., "1"). Object A is a root object in object tree 202, indicating that no other object contains a pointer to or reference of object A. Accordingly, a data field of row 306 corresponding to parent column 304 (parent object data field) can store a "null" value.

Likewise, row 308 of the object table 300 can store an identifier of object B (e.g., "2") in the object identifier data field of row 308, and an identifier of object A in the parent object data field of row 308 to indicate that object A is a parent object of object B. Row 310 and row 312 can represent object C and object D, respectively, and their relations to object A and to each other.

The object table 300, having rows 306, 308, 310 and 312, can be queried to discover ancestors and descendants of a given object. For example, to retrieve a parent of object C, a query can retrieve the object identified in the parent object data field of row 310 that corresponds to object C. To retrieve a child of object C, a query can retrieve the object identified in the object identifier data field of a row (in this example, the row 312) whose parent object data field stores an identifier (in this example, "3") of object C.

Object table 300 can have object name column 314 for storing names of each object (e.g., "A," "B," "C" and "D") and object status column 316 for storing a status of the object. A data field corresponding to the status column 316 (status data field) can store a status indicating whether a corresponding object is ready to be deleted. Additional details on utilizing the object status column 316 in hierarchical garbage collection are described below in reference to FIGS. 4 and 5.

Figure 4:
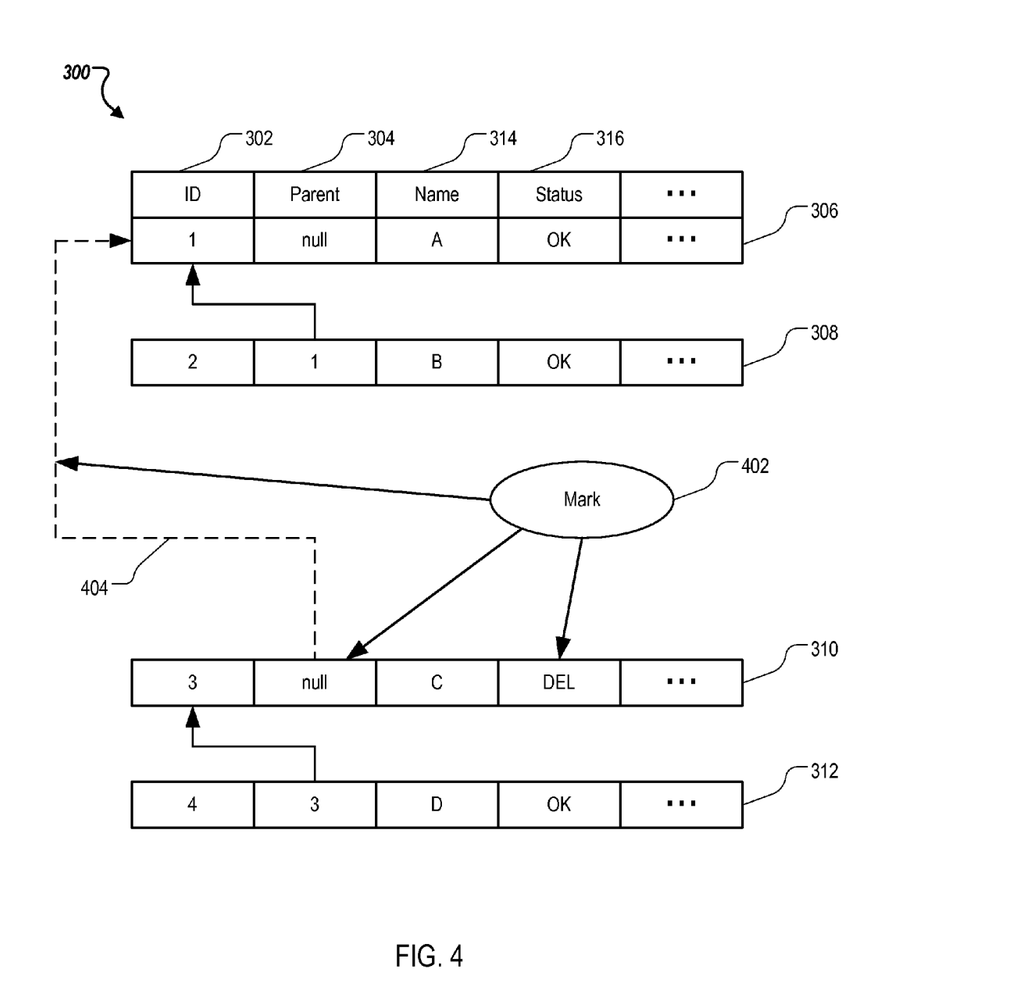
FIG. 4 is a diagram illustrating examples of mark operations in hierarchical garbage collection.

FIG. 4 is a diagram illustrating mark operations 402 in hierarchical garbage collection. Mark operations 402 can be performed by object marker 112 (of FIG. 1) on object table 300. The mark operations 402 can mark objects that are designated for deletion systematically and incrementally. Object marker 112 can follow objects that are selected for deletion based on a request from application interface 108 (of FIG. 1). In the example shown, the application interface 108 requests deletion of object C, which is represented in row 310 of object table 300.

The mark operations 402 include designating object C as a root object, and designating object C for deletion by an object sweeper (which is described below in reference to FIG. 5). Designating object C as a root object includes severing a relationship 404 between object C and its parent object (in this example, object A). Severing the relationship 404 can include setting a parent object data field in row 310 to null (or any value, e.g., infinity, that indicates there is no parent for object C). Designating object C for deletion includes inserting a deletion marker in status data field of row 310. Each record in object status column 316 in object table 300 can have an initial value (e.g., "OK") indicating the object is not marked for deletion. The inserted deletion marker (e.g., "DEL") in the status data field of row 310 can indicate that object C is ready to be deleted. Based on the inserted deletion marker in row 310, a sweeper can delete the row 310 and object C, which is represented by row 310.

Figure 5:
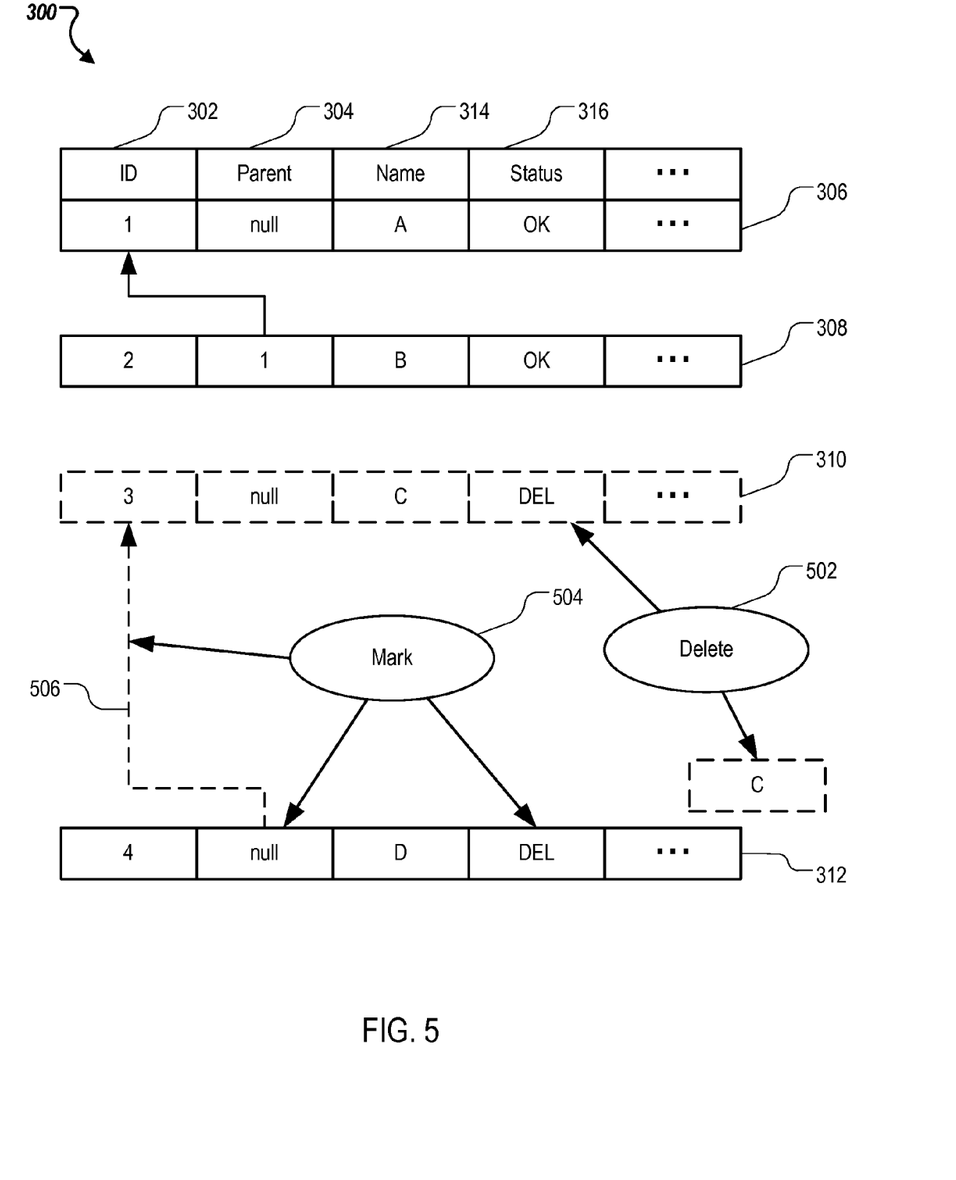
FIG. 5 is a diagram illustrating examples of sweep operations in hierarchical garbage collection.

FIG. 5 is a diagram illustrating sweep operations in hierarchical garbage collection. An object sweeper of the object-relational database 102 can perform sweeping operations periodically on object table 300 and objects 104 (of FIG. 1). The sweeping operations can include delete operations 502 and mark operations 504. In delete operations 502, the object sweeper can identify rows in the object table 300 that are marked for deletion, delete the rows, and delete data objects represented by the rows. For example, the object sweeper can identify row 310, based on a deletion marker stored in the status data field of row 310. The object sweeper can then delete row 310, and delete object C identified in the object identifier data field of row 310.

In mark operations 504, the object sweeper identifies children (first generation descendant) objects of each deleted object, and requests object marker 112 (of FIG. 1) to mark each child object for deletion. For example, the object sweeper can search object table 300 for rows where a parent object data field stores an identifier of a deleted object. The object sweeper identifies row 312 as representing a child object of object C based on the identifier ("3") stored in the parent object data field of row 312. The object sweeper then requests the object marker 112 to mark each identified row. The object marker 112, in response, can mark row 312 for deletion, including severing a relationship 506 between row 312 and the deleted row 310, by setting the parent object data field of row 312 to null, and storing a deletion mark in the status data field of row 312. In a next iteration of sweeping, the object sweeper can delete row 312, and object D represented by row 312. In multiple iterations, parent-child hierarchies of object arbitrary depth can be deleted in a similar manner.

Figure 6:
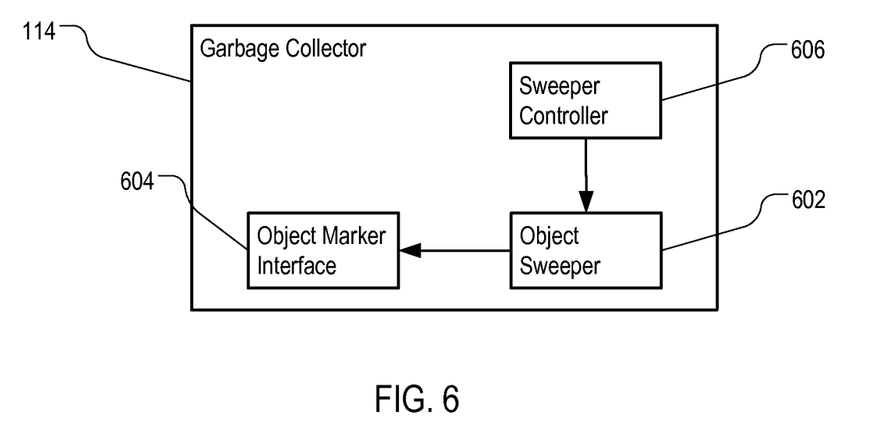
FIG. 6 is a diagram illustrating components of an example of a hierarchical garbage collector.

FIG. 6 is a diagram illustrating components of a hierarchical garbage collector. The hierarchical garbage collector can be the garbage collector 114 of FIG. 1. The hierarchical garbage collector includes an object sweeper 602, which is a component of the object-relational database 102 configured to perform the operations of the sweeping as described above in reference to FIG. 5. The hierarchical garbage collector includes object marker interface 604. The object marker interface 604 is a component of the object-relational database 102 configured to receive, from the object sweeper 602, identifiers of rows in object table 300 that represent children objects of objects deleted by the object sweeper 602, and to request the object marker 112 to mark the identified rows for deletion.

The garbage collector 114 can include a sweeper controller 606. The sweeper controller 606 is a component of the object-relational database 102 configured to specify execution parameters for the operations of the object sweeper 602. The execution parameters can include an execution frequency (e.g., X times per second or per minute) of the operations. The execution parameters can include an exit condition of the sweeping operations. The sweeping operations are iterative, and can terminate when the exit condition is satisfied. In some implementations, the sweeping operations can terminate when there are no more root objects to follow, or no more objects marked for deletion. In some implementations, the sweeping operations can terminate when a system-defined limit has been met. The limit can include a limit on number of rows inspected, or a predefined garbage collection duration. The iterative operations can terminate when object sweeper 602 has inspected at least the specified number of rows, or when an elapsed time since start of the sweeping operations reaches or exceeds the predefined garbage collection duration.

In some implementations, the execution parameters specified by sweeper controller 606 can include a trigger condition for starting object sweeper 602. The trigger condition can include a time trigger (e.g., object sweeper 602 starts sweeping at beginning of each minute or hour), or an event trigger (e.g., object sweeper 602 starts sweeping upon receiving a request from application interface 108 (of FIG. 1).

Example Procedures

Figure 7:
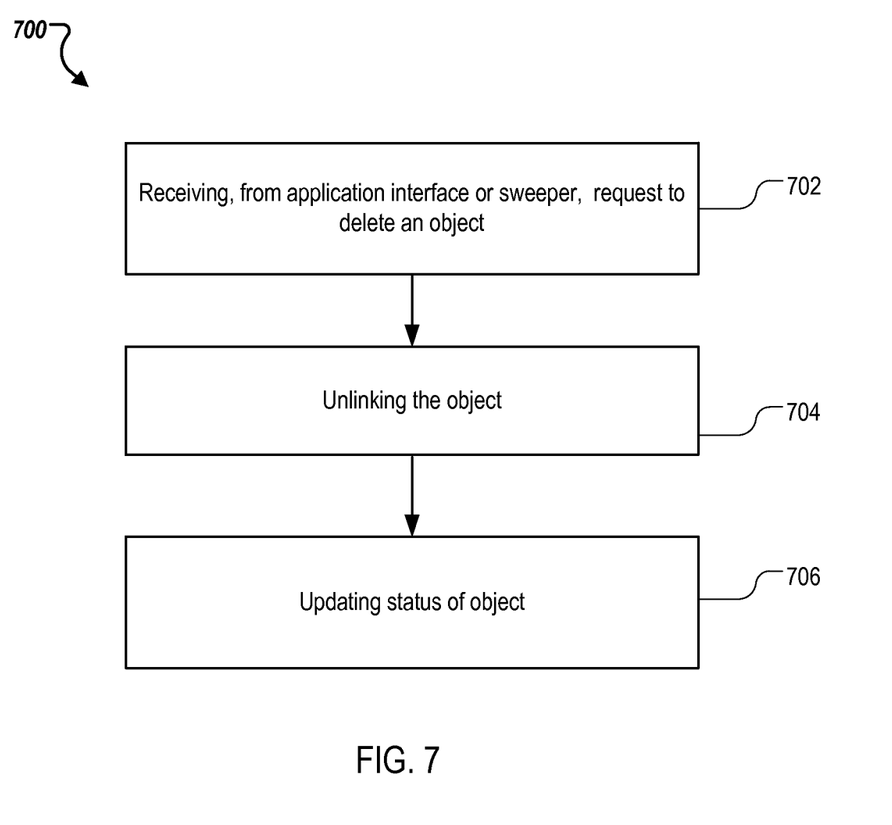
FIG. 7 is a flowchart illustrating an example of a procedure of marking objects for deletion.

FIG. 7 is a flowchart illustrating a procedure 700 of marking objects for deletion. The procedure 700 can be performed by the object marker 112 of FIG. 1.

The object marker 112 receives (702), from an application interface 108 or from an object sweeper 602, a request to delete an object. The request can include a name or other identifier of the object. The object marker 112 then searches an object table 300 for the object using the name or other identifier. If the object marker 112 finds a row representing the object, the object marker 112 unlinks (704) the object. Unlinking the object can include setting a parent object data field of the row to null. The object marker 112 updates (706) a status of the object. Updating the status of the object can include storing a deletion marker in a status data field in the row, indicating that the object sweeper 602 can delete the row and the object represented in the row in a next sweep.

Figure 8:
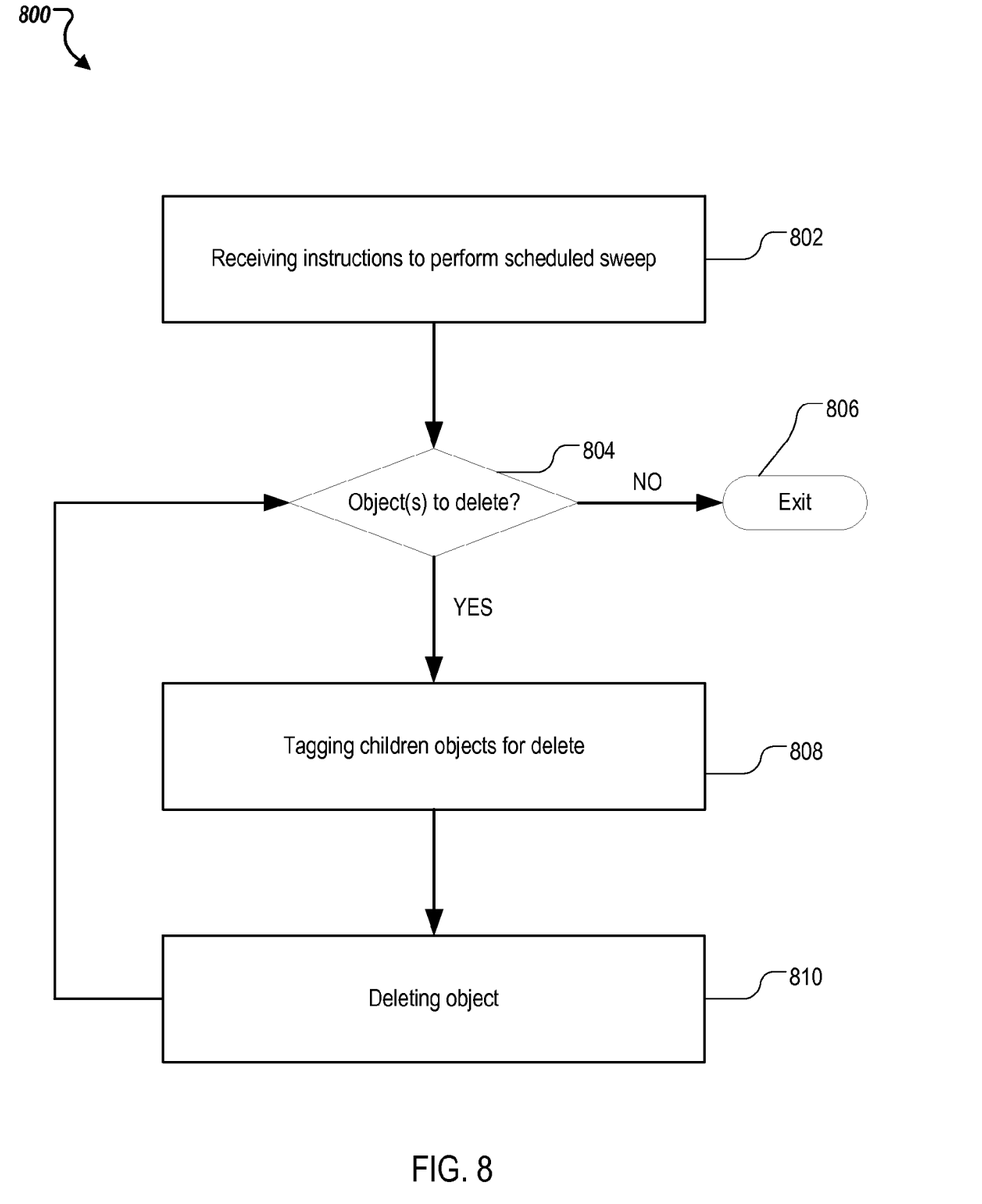
FIG. 8 is a flowchart illustrating an example of a procedure of sweeping objects for deletion.

FIG. 8 is a flowchart illustrating a procedure 800 of sweeping objects for deletion. The procedure 800 can be performed by the object sweeper 602 of FIG. 6. The object sweeper 602 receives (802) one or more instructions to perform object sweeping operations. The instructions can be provided by a system based on a trigger time (e.g., a time set by sweeper controller 606 for starting sweeping) or a trigger event (e.g., when application interface 108 receives a request to delete an object).

The object sweeper 602 determines (804) if there are objects to delete. The object sweeper 602 can make the determination by searching object table 300 for rows that represent root objects and marked for deletion. If the object sweeper 602 identifies no objects to delete, or when an exit condition has been satisfied, the object sweeper 602 can exit (806).

If the object sweeper 602 identifies one or more objects to delete, the object sweeper 602 tags (808) each child object of each identified object for deletion. Tagging a child object for deletion can include causing object marker 112 to store a deletion marker in a status data field of a row representing the child object in the object table 300. The object sweeper 602 can delete (810) the identified object from a storage device (e.g., memory), and delete the corresponding row from the object table 300. The object sweeper 602 can then go back to stage 804 to perform a next iteration.

Figure 9:
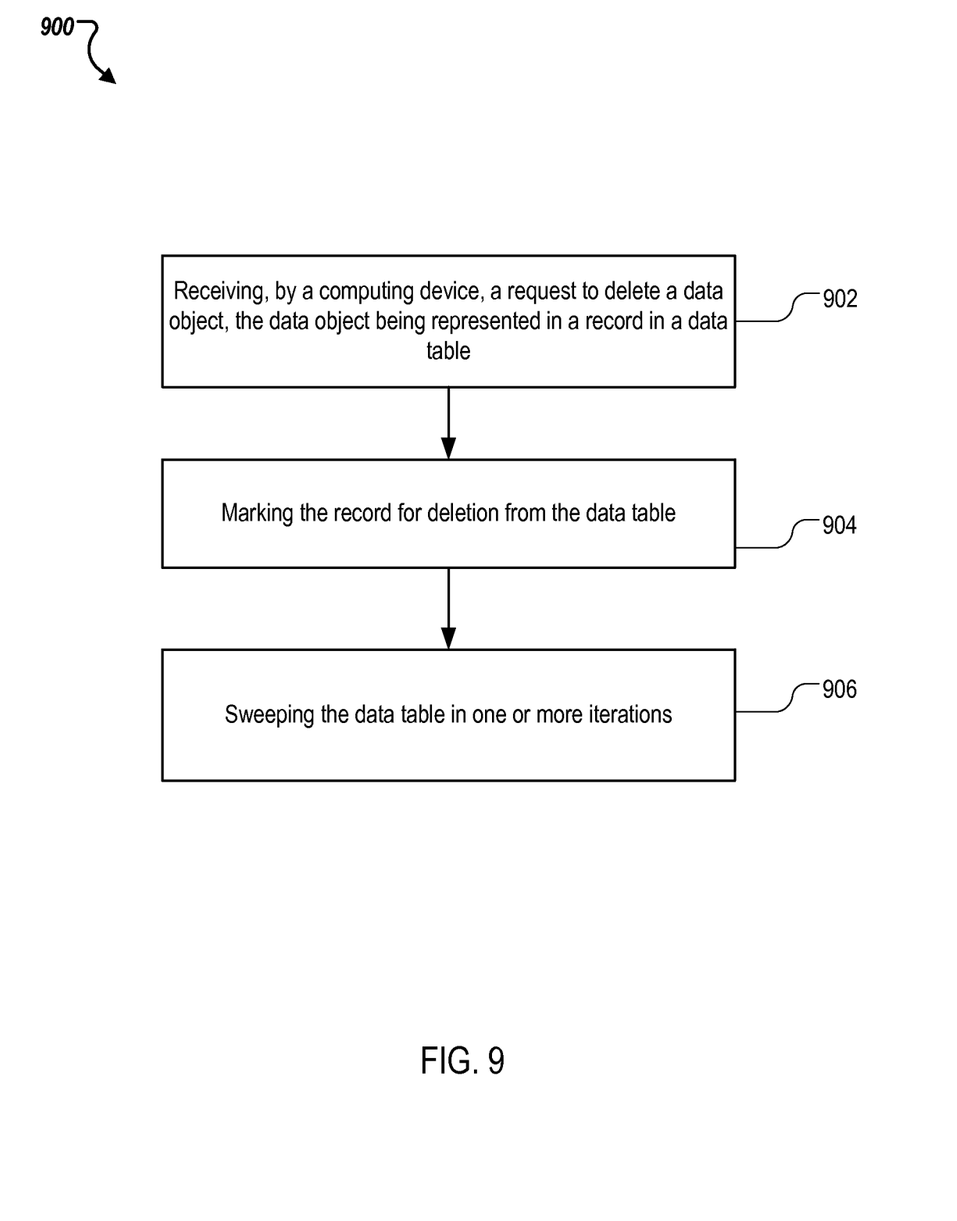
FIG. 9 is a flowchart illustrating an example of a procedure of hierarchical garbage collection.

FIG. 9 is a flowchart illustrating a procedure 900 of hierarchical garbage collection. The procedure 900 can be performed by a system implementing object-relational database 102. The system can include one or more standalone or networked computers. The system can be an enterprise-scale database system.

The system can receive (902) a request to delete a data object (e.g., object C of FIG. 2). The data object is represented in a record in a data table. The record can be a row (e.g., row 310) in object table 300. An object identifier data field of the record stores a representation of the data object. A parent identifier data field of the record stores a representation of a parent object of the data object. The parent object of the data object is an object referencing the data object by containing a pointer to or reference of the data object. The system can receive the request from a component of the system or from a computer outside of the system.

The system marks (904) the record for deletion from the data table. Marking the record for deletion can include storing a deletion marker in a status data field of the record and designating the data object represented in the object identifier data field of the record as a root object. Designating the data object represented in the object identifier data field of the record as a root object can include clearing a parent identifier data field of the record The system sweeps (906) the data table in one or more iterations. In each iteration, the system can delete, from the data table, each record marked for deletion. The system deletes each data object represented in an object identifier field of the deleted record. The system then marks, for deletion from the data table in a next iteration, each record for which a parent identifier data field stores a representation of the deleted data object. The system performs the one or more iterations until an exit condition is satisfied. The exit condition is satisfied when all root objects represented in records in the data table are deleted or when a number of records inspected for deletion has exceeded a defined limit. In some implementations, the system can perform the one or more sweeping iterations as a background procedure independent of receiving the request. In some implementations, the request to delete an object can trigger the system to perform the one or more sweeping iterations.

In some implementations, after marking the record for deletion from the data table and before the data object is deleted, the system can prevent a query from accessing the data object. Accordingly, the data object can appear to an application program or procedure as deleted while waiting form deletion from a next sweep.

Example System Architecture

Figure 10:
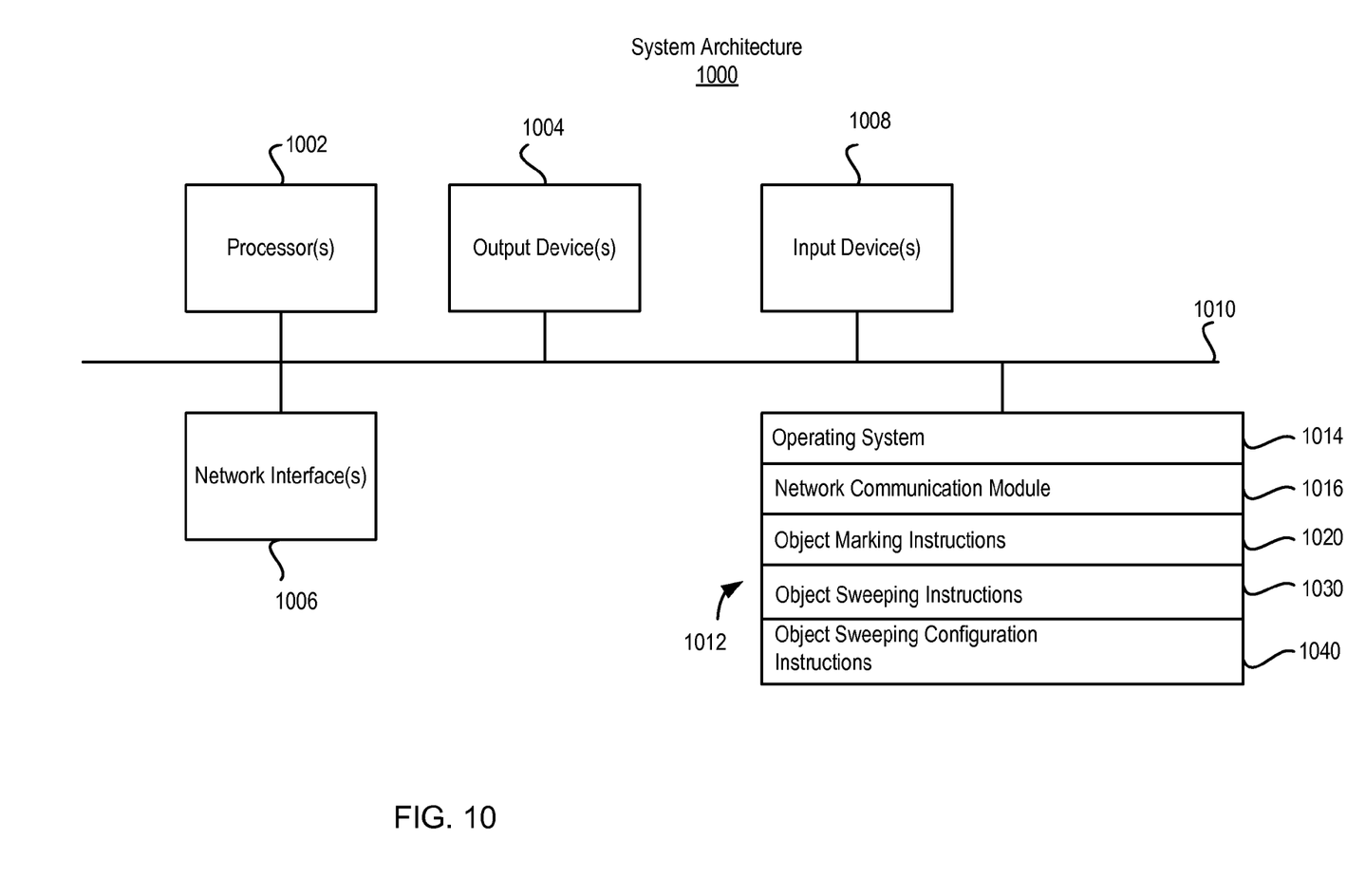
FIG. 10 is a block diagram of example of a system architecture for implementing the features and operations of FIG. 1-9.

FIG. 10 is a block diagram of a system architecture 1000 for implementing the features and operations of FIG. 1-9. Other architectures are possible, including architectures with more or fewer components. In some implementations, architecture 1000 includes one or more processors 1002 (e.g., dual-core Intel® Xeon® Processors), one or more output devices 1004 (e.g., an interface to a LCD monitor), one or more network interfaces 1006, one or more input devices 1008 (e.g., a mouse, keyboard, touch-sensitive display, or a remote control) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Examples of transmission media include, without limitation, coaxial cables, copper wire and fiber optics.

Computer-readable medium 1012 can further include operating system 1014 (e.g., Mac OS® server, Windows Server®, UNIX®, Linux®, or iOS®), network communication module 1016, object marker instructions 1020, object sweeping instructions 1030, and object sweeping configuration instructions 1040. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Object marking instructions 1020 can include computer instructions that, when executed, cause processor 1002 to perform operations of object marker 112. Object sweeping instructions 1030 can include computer instructions that, when executed, cause processor 1002 to perform operations of object sweeper 602 and object marker interface 604. Object sweeping configurations instructions 1040 can include computer instructions that, when executed, cause processor 1002 to perform operations of sweeper controller 606.

Architecture 1000 can be implemented, for example, in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, SQL, or Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a PAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Although particular implementations are described above, various modifications can be made. Accordingly, other implementations are within the scope of the claims.

What is claimed is:

1. A method comprising:
   receiving, by one or more computers, a request to delete a data object, the data object being represented in a record in a data table, wherein an object identifier data field of the record stores a representation of the data object, and a parent identifier data field of the record stores a representation of a parent object of the data object;
   marking the record for deletion from the data table; and
   sweeping the data table in a plurality iterations including a first iteration and a second iteration subsequent to the first iteration, wherein the first iteration comprises:
      deleting, from the data table, each record marked for deletion;
      deleting each data object represented in an object identifier field of the deleted record; and then
      marking, for deletion from the data table in the second iteration, each record for which a parent identifier data field stores a representation of the deleted data object,
   wherein the second iteration comprises deleting each record marked for deletion by the first iteration, and
   wherein the one or more computers perform the iterations until an exit condition is satisfied.

2. The method of claim 1 wherein the parent object of the data object is an object referencing the data object.

3. The method of claim 1 wherein marking the record for deletion from the data table comprises storing a deletion marker in a status data field of the record and designating the data object represented in the object identifier data field of the record as a root object.

4. The method of claim 3 wherein designating the data object represented in the object identifier data field of the record as a root object comprises clearing a parent identifier data field of the record.

5. The method of claim 3 wherein the exit condition is satisfied when all root objects represented in records in the data table are deleted or when a number of records inspected for deletion has reached or exceeded a defined limit.

6. The method of claim 1 comprising:
   after marking the record for deletion from the data table and before the data object is deleted, preventing a query from accessing the data object.

7. The method of claim 1 wherein the one or more computers perform the one or more sweeping iterations as a background procedure independently of receiving the request.

8. A non-transitory storage medium storing computer instructions operable to cause one or more computers to perform operations comprising:
   receiving a request to delete a data object, the data object being represented in a record in a data table, wherein an object identifier data field of the record stores a representation of the data object, and a parent identifier data field of the record stores a representation of a parent object of the data object;
   marking the record for deletion from the data table; and
   sweeping the data table in a plurality of iterations including a first iteration and a second iteration subsequent to the first iteration, wherein the first iteration comprises:
      deleting, from the data table, each record marked for deletion;

deleting each data object represented in an object identifier field of the deleted record; and then marking, for deletion from the data table in the second iteration, each record for which a parent identifier data field stores a representation of the deleted data object, wherein the second iteration comprises deleting each record marked for deletion by the first iteration, and wherein the one or more computers perform the iterations until an exit condition is satisfied.

9. The non-transitory storage medium of claim 8 wherein the parent object of the data object is an object referencing the data object.

10. The non-transitory storage medium of claim 8 wherein marking a record for deletion from the data table comprises storing a deletion marker in a status data field of the record and designating the data object represented in the object identifier data field of the record as a root object.

11. The non-transitory storage medium of claim 10 wherein designating the data object represented in the object identifier data field of the record as a root object comprises clearing a parent identifier data field of the record.

12. The non-transitory storage medium of claim 10 wherein the exit condition is satisfied when all root objects represented in records in the data table are deleted or when a number of records inspected for deletion has exceeded a defined limit.

13. The non-transitory storage medium of claim 8 wherein the operations further comprise:

after marking the record for deletion from the data table and before the data object is deleted, preventing a query from accessing the data object.

14. The non-transitory storage medium of claim 8 wherein the instructions cause the one or more computers to perform the one or more sweeping iterations as a background procedure independently of receiving the request.

15. A system comprising:

one or more computers programmed to receive a request to delete a data object, the data object being represented in a record in a data table, wherein an object identifier data field of the record stores a representation of the data object, and a parent identifier data field of the record stores a representation of a parent object of the data object; and a non-transitory storage medium storing computer instructions operable to cause the one or more computers to perform operations comprising:

marking the record for deletion from the data table; and sweeping the data table in a plurality of iterations including a first iteration and a second iteration subsequent to the first iteration, wherein the first iteration comprises:

deleting, from the data table, each record marked for deletion;

deleting each data object represented in an object identifier field of the deleted record; and then marking, for deletion from the data table in the second iteration, each record for which a parent identifier data field stores a representation of the deleted data object, wherein the second iteration comprises deleting each record marked for deletion by the first iteration, and wherein the one or more computers are programmed to perform the iterations until an exit condition is satisfied.

16. The system of claim 15 wherein the parent object of the data object is an object referencing the data object.

17. The system of claim 15 wherein marking a record for deletion from the data table comprises storing a deletion marker in a status data field of the record and designating the data object represented in the object identifier data field of the record as a root object.

18. The system of claim 17 wherein designating the data object represented in the object identifier data field of the record as a root object comprises clearing a parent identifier data field of the record.

19. The system of claim 17 wherein the exit condition is satisfied when all root objects represented in records in the data table are deleted or when a number of records inspected for deletion has exceeded a defined limit.

20. The system of claim 15 the operations comprising:

after marking the record for deletion from the data table and before the data object is deleted, preventing a query from accessing the data object.

21. The system of claim 15 wherein the one or more computers perform the one or more sweeping iterations in response to receiving the request or as a background procedure independently of receiving the request.

22. A system comprising:

a non-transitory storage device storing a data object and a data table, the data object being represented in a record in a data table, wherein an object identifier data field of the record stores a representation of the data object, and a parent identifier data field of the record stores a representation of a parent object of the data object;

an application interface programmed to receive a request to delete a data object;

an object marker programmed to mark the data record for deletion from the data table; and an object sweeper programmed to perform, in a plurality iterations until an exit condition is satisfied, object sweeping operations, the iteration including a first iteration and a second iteration subsequent to the first iteration, wherein the first iteration of the object sweeping operations comprises:

deleting, from the data table, each record marked for deletion;

deleting, from the storage device, each data object represented in an object identifier field of the deleted record; and then marking, for deletion from the data table, each record for which a parent identifier data field stores a representation of the deleted data object, and wherein the second iteration comprises deleting each record marked for deletion by the first iteration.

* * * * *